United States Patent [19]
Horr et al.

[11] 4,214,941
[45] Jul. 29, 1980

[54] TIRE DRUM SUPPORT

[75] Inventors: Arthur N. Horr, Uniontown; Clifford A. Landsness, Akron, both of Ohio

[73] Assignee: The B. F. Goodrich Company, Akron, Ohio

[21] Appl. No.: 948,059

[22] Filed: Oct. 2, 1978

[51] Int. Cl.[2] .......................................... B29H 17/16
[52] U.S. Cl. ....................................... 156/414; 156/96; 156/416; 301/23; 425/17
[58] Field of Search ........................ 156/96, 126–129, 156/394, 414, 415, 416; 425/17, 24, 26, 27, 28 P, 58; 301/23, 24, 26

[56] References Cited

U.S. PATENT DOCUMENTS

| | | | |
|---|---|---|---|
| 3,342,663 | 9/1967 | Pouilloux | 156/416 |
| 3,405,023 | 10/1968 | Eckenwiler et al. | 156/415 |
| 3,809,592 | 5/1974 | Dennis et al. | 156/96 |
| 3,923,572 | 12/1975 | Garver | 156/416 |
| 3,925,141 | 12/1975 | Caretta | 156/414 |
| 4,011,125 | 3/1977 | Pelletier | 156/96 |
| 4,013,499 | 3/1977 | Benigni | 156/96 |
| 4,129,474 | 12/1978 | Martin | 156/96 |

FOREIGN PATENT DOCUMENTS 787888  6/1968 Canada ..................................... 156/416

*Primary Examiner*—John E. Kittle
*Attorney, Agent, or Firm*—Joseph Januszkiewicz

[57] ABSTRACT

A rim for temporary support of a tire carcass in an inflated condition, and for slow rotation, during application of tread rubber, consists of two airtight discs adjustably mounted on a power driven shaft, one disc having a fixed bead seat and the other disc having a removable bead seat. The space between the bead seats is bridged by telescoping supports, and a safety lock is provided.

7 Claims, 6 Drawing Figures

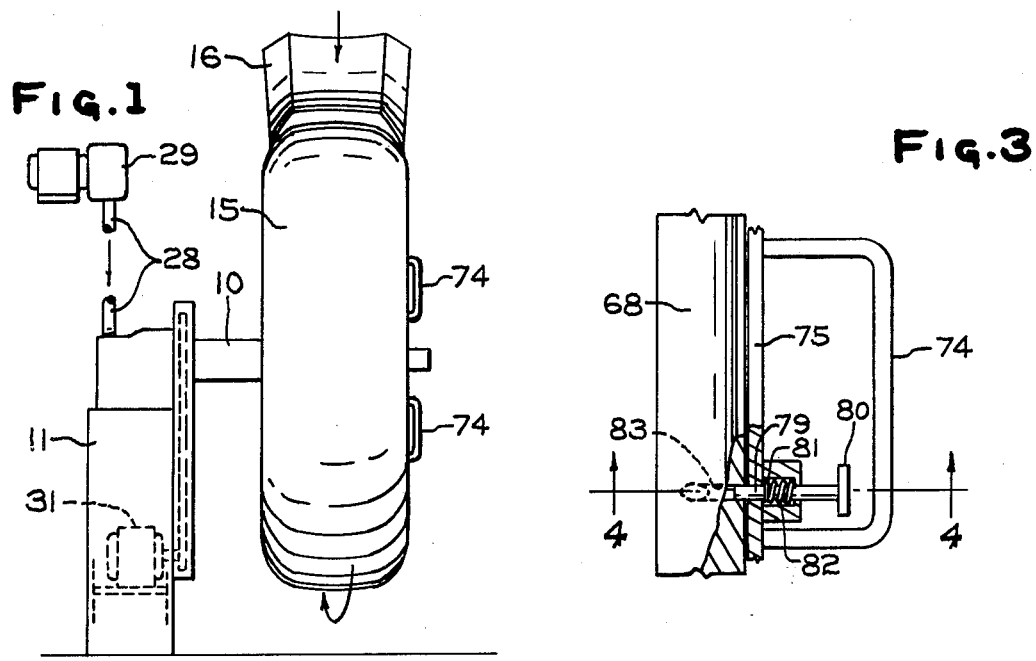
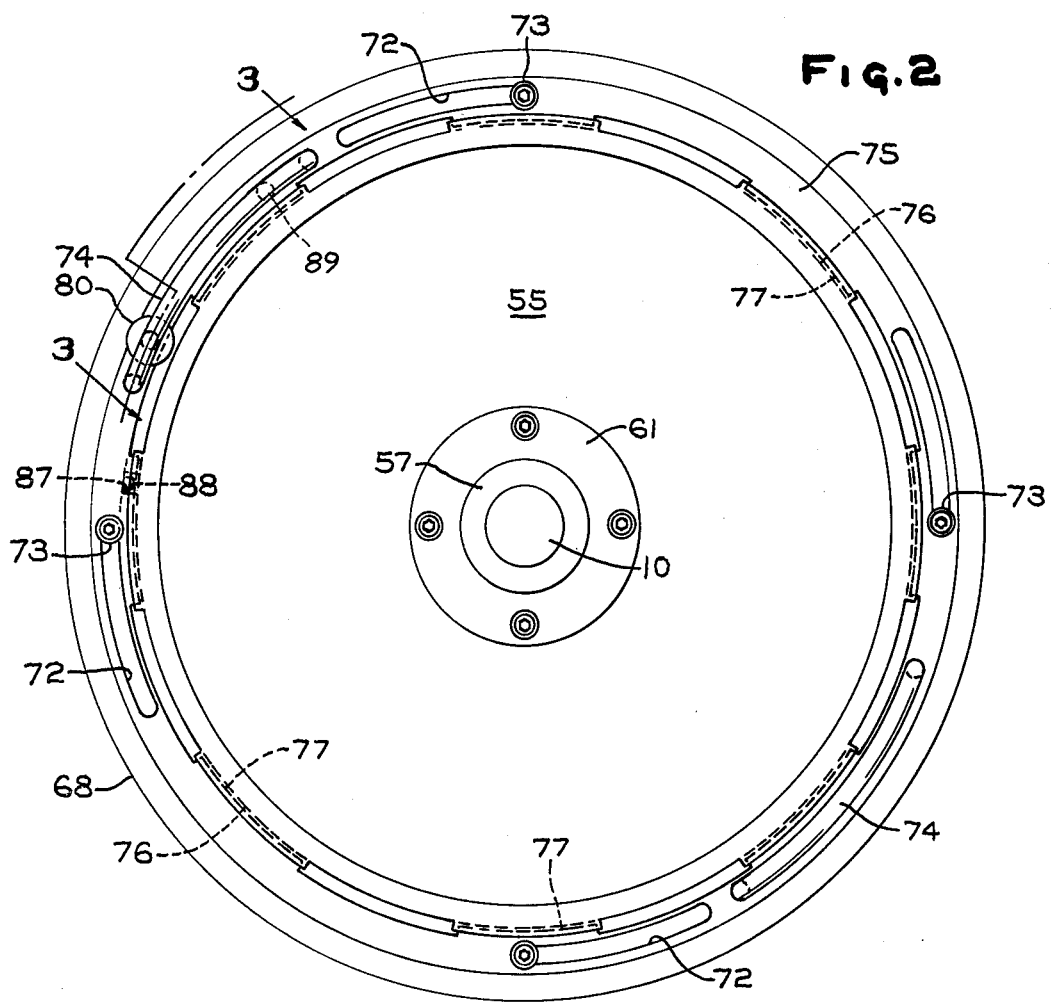

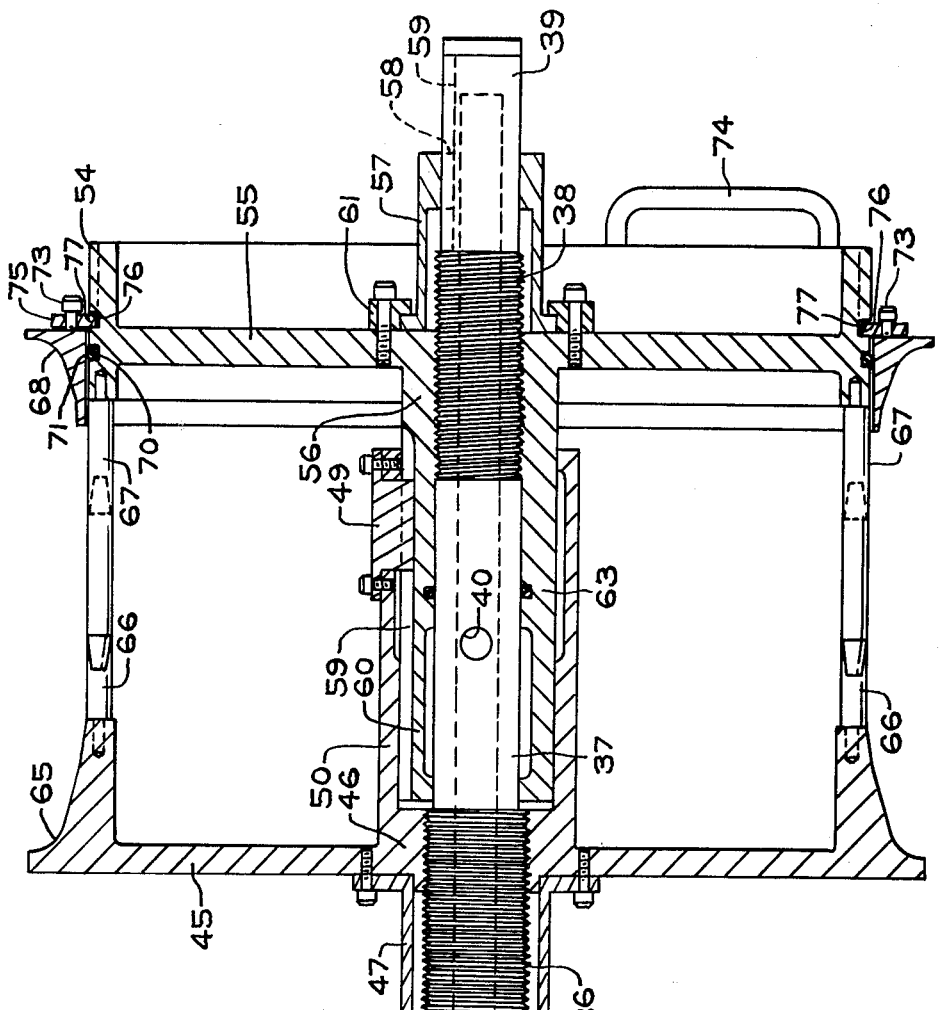
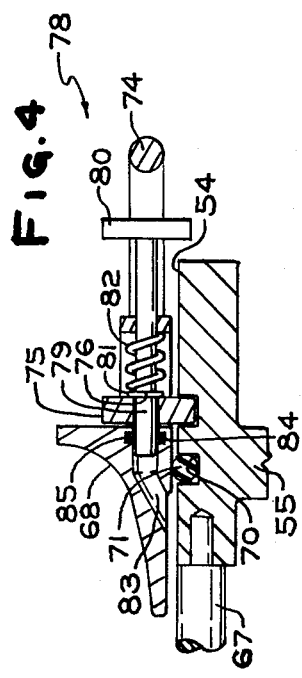
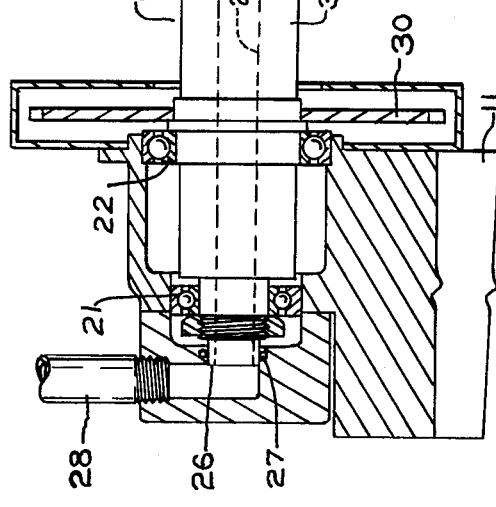

TIRE DRUM SUPPORT

BACKGROUND OF THE INVENTION

In the manufacture of pneumatic tires, the general practice has been to assemble the carcass components in the shape of a cylindrical band and then to apply tread rubber as the final step, or one of the final steps in the assembly process. In the case of small relatively lightweight tires, such as passenger car tires, the tread rubber can be, and often is, applied while the carcass is in the shape of an essentially cylindrical band, following which the assembled but still unvulcanized tire is expanded to approximately its final toroidal contours. A different procedure is required for large heavy tires.

Large radial tires for heavy trucks, aircraft, or off-the-road vehicles are generally built by assembling the carcass parts in some approximation to the final toroidal shape, or, if assembly in the approximate shape of a cylinder is possible and convenient, by reshaping the carcass to an approximation of its final toroidal shape before the tread rubber is applied. The application of the tread to the toroidal carcass then requires some specialized procedures and equipment.

This equipment must present the toroidal carcass to equipment for feeding tread rubber so that the rubber can be applied uniformly around the circumference of the carcass and so that satisfactory resistance to stitching pressure for uniting the tread rubber to the carcass can be provided by inflation of the tire. The equipment heretofore used for supporting large, heavy carcasses for application of treads has generally been some adaptation of the conventional tire supporting rims of vehicle wheels, or else devices which expand to grip the radially inner surface of each tire bead. The mounting and dismounting of the carcasses on such equipment has been laborious and costly, and has not always provided the precise location required for symmetrical placement of the tread rubber.

The object of this invention, accordingly, is to provide a superior, accurate and convenient construction for a temporary support for a large, heavy tire carcass permitting satisfactory precise mechanized application of tread rubber in a symmetrical position on the carcass.

SUMMARY OF THE INVENTION

The machine of this invention consists of a flanged wheel simulating a road wheel in that it presents surfaces for air-tight engagement with the beads of a tire, supporting the beads in a precise location both radially and axially, together with suitable drive means for rotation, and provision of means for inflation of the tire. It differs from road wheels in numerous respects and preferably in including means for adjusting the distance between the two flanges so that different sizes of tires can be handled on a single wheel and also in various other respects which will be pointed out in detail, including particularly provision for quick and easy removal of one of the flanges and for secure locking of the removable flange so that it cannot become disengaged while the tire is inflated.

BRIEF DESCRIPTION OF THE DRAWINGS

FIG. 1 is a view of the machine of this invention with a green carcass of a pneumatic tire mounted and inflated and with rubber being fed onto the periphery of the tire.

FIG. 2 is a side view of the tire supporting wheel showing the provision for quick removal of the outward tire supporting flange.

FIG. 3 is a detail view of the safety locking device which prevents unintended disengagement of the removable flange.

FIG. 4 is a section through line 4—4 of FIG. 3.

FIG. 5 is a longitudinal section showing the internal details of construction.

FIG. 6 is a fragmentary cross-sectional view of a portion of tire supporting disc with the bead ring and locking ring in section.

DETAILED DESCRIPTION

As shown in FIG. 1, the machine of this invention consists of a cantilever shaft 10 mounted on a pedestal 11, or other suitable support, with sufficient clearance around it for handling of a green tire and mounting the tire on the machine. The completed carcass 15 of a tire is shown in place in an inflated condition with tread rubber 16 being fed onto the periphery of the carcass.

Referring now to FIG. 5, which is a longitudinal section of the machine, the immediate support for shaft 10 is a bearing housing fastened to pedestal 11, and containing appropriate bearings 21 and 22. The shaft 10 contains an axial bore 25 for the supply of compressed air for inflation, for which purpose the very inboard end 26 of the shaft engages a sealing ring 27 so that compressed air can be supplied by a remote signal from a suitable compressor 29 at an appropriate pressure through air pipe 28.

The shaft 10 is also provided with conventional drive means, such as sprocket 30, which may be driven at a slow speed by a chain connected to a suitably controlled motor.

The shaft 10 has a portion of a fairly large diameter close to the drive sprocket 30. This large diameter portion 35 of the shaft is polished so that air loss can be prevented when a sealing ring is applied to it. Proceeding in the direction away from the support, the shaft consists of several other sections. First, a left-hand threaded section 36, then a reduced diameter central part 37, at least a part of which is also polished for sealing against a sealing ring, a right-hand threaded part 38, and finally a closed outer end 39 of still smaller diameter. Between the left-hand threaded part 36 and the central polished part, the part 37 of the shaft is transversely drilled to provide communication of the compressed air supply through a plurality of circumferentially spaced holes 40 with the inside of the tire which is to be temporarily mounted on the machine.

The rim on which the tire is actually mounted consists preferably of a pair of spaced discs with peripheral flanges for positioning and sealing against the beads of a tire of a particular bead size. The left disc 45 in FIG. 5, which is the one closest to the supported end of shaft 10, has a hub 46 which has a left-hand internal thread fitting the left-hand threaded part 36 of the shaft. Preferably, a dust cover 47 is provided to cover the exposed part of the threaded shaft, with a sealing ring 48 to prevent loss of the inflation air along the shaft. The periphery of left disc 45 is shaped as a tire bead supporting flange or bead seat 65.

Similarly, the right-hand disc 55 has a hub 56 with an internal right-hand thread fitting the right-hand threaded portion 38 of the shaft and is preferably also provided with a dust cover 57 having a key 58 engaging keyway 59. A clamp 61 locks hub 56 immovably to the outer end 39 of shaft 10.

Disc 55 is also constructed for support of a tire bead but in a different way, as will be explained.

The hub 56 of the right-hand disc 55 has an inner tubular extension 60 extending toward and past the axial center of the wheel, with its midportion sealed against the center polished part 37 of the shaft by sealing ring 63. This tubular part 60 is provided with one or more key ways 59 for a purpose which will be explained.

The left-hand hub 46 similarly has an internal extension 50 around the shaft past the midpoint of the width of the wheel, with an internal diameter just fitting the outside of the right hub extension 60, and is provided with a removable key 49 fitting keyway 59, constraining the two hubs 46 and 56 and therefore the external peripheries of discs 45 and 55 to rotate in unison.

As will be apparent, rotation of the hubs 46 and 56 of the wheel with respect to the shaft will cause motion of the hubs on the right-and left-hand screws 36 and 38, thereby changing the spacing of the peripheral tire-supporting flanges. When a desired spacing of the flanges is achieved, further change is prevented by locking one or both of the hubs 46 and 58 to the shaft 10, as by clamp 61 gripping the right-hand dust cover 57, which is keyed to the end 39 of the shaft.

This location of the clamp is particularly convenient because of ease of accessibility when adjustment of spacing of the bead seats is desirable.

Since the tires on which treads are applied while the carcasses are toroidal in shape are generally large, heavy, and stiff, it is not easily possible to "button-hole" the tire beads over bead-engaging flanges, as is commonly done with relatively thin and light passenger car tires. Consequently, the outboard flange needs to be easily removable.

Moreover, the structure should be such as to supply adequate support for each of the beads of a tire while the carcass is slipped onto the machine, and again when the assembly of carcass and tread is removed. The machine also needs to be easily adjustable so that tires of considerably differing widths can be handled on the same machine.

These results are accomplished by axial extensions of the bead-receiving rings, in the form of spaced fingers resembling circular combs. These fingers, extending from opposite sides past the center, overlap in such a manner as to give essentially continuous circumferential support regardless of the exact spacing between the inboard disc 45 near the left side of FIG. 4 and the outboard disc 55 near the right side of FIG. 4.

The left disc 45, closest to the pedestal 11, has its periphery shaped to the form of a bead seat or bead ring 65 corresponding to the dimensions of a particular size of rim and has fastened to it a set of axially projecting spaced fingers 66.

The outboard disc 55 likewise is equipped with a set of fingers 67 fitting between fingers 66 so as to form an axially continuous support for the beads of a tire being slid on or off of the machine.

The right-hand bead seat or bead ring 68 is not part of disc 55 but is a separate ring with a cylindrical inner surface dimensioned for easy sliding on and off of the cylindrical outer surface 54 of the disc 55, and is held in place by a locking ring 75. A circumferential groove 70 in the cylindrical periphery 54 of right-hand disc 55 contains a sealing ring 71 engaging the cylindrical inner surface of the bead seat 68.

This construction permits inflation of a tire mounted on bead seats or bead rings 65 and 68. The tire bridges and seals the space between the two bead seats so that compressed air supplied through pipe 28 and passing through the shaft will enter the space between the two discs 45 and 55 and inflate the tire.

The removable bead seat or bead ring 68 is held in place against the inflation pressure by locking ring 75, which fits in a groove 76 in the external cylindrical face of disc 55. The locking ring 75 has a continuous face bearing against removable bead seat 68, but radially inwardly it is cut away at intervals leaving alternating spaces and inwardly projecting solid metal segments 77 fitting in groove 76. The cylindrical periphery 54 of disc 55 is correspondingly cut away in as many locations as the segments 77, to permit locking ring 75 to be slid axially on and off, and when on as far as it will go, to be rotated by a small angle to lock bead seat 68 in place. The outer periphery of disc 55 has a slot 87 (FIG. 6) thereon to receive the head of a bolt 88 securely fastened to bead seat or bead ring 68. This permits the rotation of locking ring 75 relative to bead ring 68 since the head of bolt 88 engages the side of slot 87 in disc 55 and prevents the rotation of bead ring 68 while permitting the rotation of bead ring 75 relative to bead ring 68. The number of slots 87 and bolts 88 may be increased to provide a plurality of means to prevent the rotation of bead ring 68 relative to the tire support means of discs 45 and 55.

Since it is the bead seat or bead ring 68 which must be removed and replaced, it is convenient to fasten locking ring 75 loosely to the bead seat 68 so that they can be removed and replaced as a unit. This is accomplished, as shown in FIG. 2, by cutting arcuate slots 72 in locking ring 75, and fastening the locking ring 75 to the bead seat or bead ring 68 by bolts 73 fitting loosely in the slots, but seated firmly in threaded holes in the bead seat 68. Bolts 73 also function as stops to prevent rotation of ring 75 beyond a small angle relative to bead ring 68. For further convenience in handling, handles 74 are secured to locking ring 75. These handles are also used for turning the locking ring 75 for locking and unlocking the outboard bead seat or bead ring 68.

Unless the locking ring 75 is in the lock position on right bead seat or bead ring 68, the plunger 79 cannot seal against the 0-ring 85 and inflation of the tire on rings 65 and 68 cannot take place since air escapes through passage 83.

It is important that inflation of the tire carcass be permitted only if the rings are securely locked in place, and only with a pressure which the machine can withstand safely. Accordingly, the machine is provided with a safety latch which provides multiple functions for preventing unsafe conditions from arising.

These safety functions are provided by a latch 78 of a particular construction, shown in FIG. 3 and 4. The latch consists of a cylindrical plunger 79, with a knob 80 at its exposed end, fitting loosely in a passage 83 in the locking ring, with a spring 82 pressing on snap-ring 81, urging the plunger in the direction away from the knob. The snap-ring 81 is attached to plunger 79.

The passage 83 in the bead seat 68, slightly larger in diameter than plunger 79, provides communication between the inflation space of the tire and the atmosphere, and is in such a location that when locking ring 75 is in its locked position, plunger 79 is aligned with passage 83 and will be urged by spring 82 to enter the passage and prevent the locking ring from being unlocked because it prevents rotation of locking ring 75 relative to bead ring 68.

The passage 83 and plunger 79 provide two other important safety functions, dependent on provision of an air seal in passage 83, by placement of an O-ring 85 in an annular groove 84 in the wall of passage 83. Since the passage 83 extends completely through the bead ring 68, it provides a channel for escape of air from the space between the two discs 45 and 55, and from the tire mounted on them, unless the passage is plugged. The spring 82 is made of such a stiffness that excessively high air pressure will force plunger 79 out of passage 83, thus functioning as a safety valve, for bleeding off excess pressure. Such valve is particularly valuable in the automation of the tire building process. When the plunger 79 is withdrawn from passage 83 in preparation for unlocking the machine and removing the tire, the passage 83 will immediately release all the compressed air, so that the locking ring 75 can be safely removed. A suitable hole or recess 89 is located on bead ring 68 so as to register with plunger 79 as the locking ring 75 is rotated relative to bead ring 68 in the unlocked position. The movement of the plunger 79 into recess 89 signals the operator that ring 75 has been rotated a sufficient distance relative to bead ring 68.

Preferably, one of the handles 74 is placed over the latch 78 so as to protect it from injury, and also provide convenient hand leverage for manipulation of the latch. It is consequently a simple matter to remove both the locking ring and the bead seat, and to replace them, in the course of removal of a completely assembled tire and its replacement by another carcass which is to receive its complement of tread rubber.

The machine as described above can be used in assembling tires by any of the various procedures which are useful, such as building carcass plies and overheads before expanding the center to receive a tread or assembling carcass plies only and adding both overhead structure and tread rubber on the machine. Moreover, it can be used advantageously whatever the exact procedure for supply of tread rubber and other layers may be, including supply of a tread as a single preformed slab, or of thin layers wound on in many convolutions, or of narrow strips wound back and forth across the width, or wound to a predetermined thickness starting at one edge and finishing at the other.

The machine is universally desirable for any tire building operation in which it is preferred for assembly of material to be carried out with the carcass inflated, and consequently shaped to a contour approximating its shape when finished and mounted on a wheel for its intended use.

We claim:

1. A power driven machine for rotatably supporting a tire carcass in an inflated condition for the application of tread rubber, said machine has a central rotatable shaft, a pair of laterally spaced tire-bead supporting rings mounted on said shaft in an air-tight manner, said pair of rings supporting a tire and cooperative therewith to define an inflatable chamber, means for adjusting the axial spacing of said rings, means for supplying compressed air to said chamber for inflation, means for rotating said rings in unison, one of said rings being removably mounted, a locking device mounted on said one ring for locking said one ring into position, a passageway extending through said one ring and through said locking device for connecting said chamber to atmosphere, said locking device operative in a first position to secure said one ring in a locked condition to close said passageway to atmosphere to permit inflation of said chamber and operative in a second position to open said passageway to atmosphere.

2. A power driven machine as set forth in claim 1 wherein said locking device includes a spring actuated moveable plunger that is selectively operable to seal said passageway or open said passageway for connecting said chamber to atmosphere.

3. A power driven machine as set forth in claim 2 wherein said locking device includes a plurality of spaced segments on a rotatable ring operative to engage a plurality of spaced segments on said power driven machine to lock said rings for supporting and inflating a tire carcass.

4. A power driven machine for rotatably supporting a tire carcass in an inflated condition for the application of a tread rubber, said machine having a pair of spaced discs mounted on a rotatable shaft in an air-tight manner, drive means operatively connected to said shaft for rotating said shaft, one of said discs having a flanged portion to provide support for one bead of a tire, the other of said discs having an annular groove, a bead ring slidably received by said other disc, said bead ring having a bead seat to provide support for a bead of a tire, said bead ring and said flanged portion of said one disc cooperative with a tire mounted thereon to define a chamber, a locking ring journaled in said annular groove for rotation therein, said locking ring interconnected to said bead ring for limited rotation relative thereto, a passageway in said bead ring for communicating said chamber with atmosphere, said locking ring supporting a plunger that is operative to sealingly engage said passageway, and spring bias means operative to urge said plunger into sealingly engagement with said passageway.

5. A power driven machine as set forth in claim 4 wherein said other disc has a plurality of circumferentially spaced recesses communicating directly with said annular groove, said locking ring having a plurality of circumferentially spaced radially inwardly extending segments cooperative with said recesses to selectively lock and unlock said rings relative to said other disc.

6. A power driven machine as set forth in claim 5 wherein said plunger supported by said locking ring has a spring biasing said plunger axially inwardly in the direction of said passageway, and said bead ring having a bore spaced arcuately from said passageway to receive said plunger upon rotation of said locking ring relative to said bead ring.

7. A power driven machine as set forth in claim 6 wherein said locking ring has a plurality of circumferentially spaced arcuately shaped recesses, and said bead ring having a plurality of circumferentially spaced bolts extending through said arcuately shaped recesses to interconnect said rings and provide said limited rotation.

* * * * *